Figure 1:
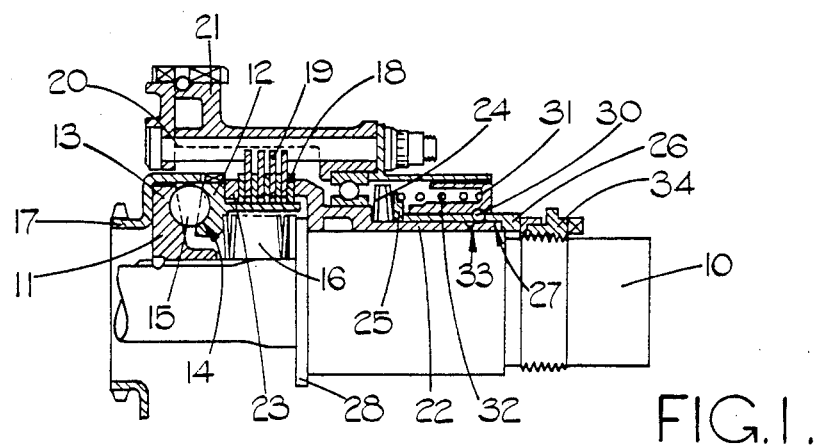

United States Patent [19]

Maltby et al.

[11] Patent Number: 4,625,843
[45] Date of Patent: Dec. 2, 1986

[54] TORQUE LIMITER WITH DEVICE INDICATING OPERATION THEREOF

[75] Inventors: Peter J. Maltby; Ray Parker, both of Wolverhampton, England

[73] Assignee: Lucas Industries public limited company, Birmingham, England

[21] Appl. No.: 710,067

[22] Filed: Mar. 11, 1985

[30] Foreign Application Priority Data

Mar. 17, 1984 [GB] United Kingdom ................ 8407029

[51] Int. Cl.$^4$ ........................ F16D 43/20; F16D 67/02
[52] U.S. Cl. ............................... 192/8 R; 192/30 W; 192/56 R; 188/134
[58] Field of Search .................. 192/8 R, 18 R, 30 W, 192/56 R, 150; 188/134

[56] References Cited

U.S. PATENT DOCUMENTS 1,883,164 10/1932 Vassakos ............................. 192/150
3,596,740 8/1971 Nau ..................................... 188/134
3,701,401 10/1972 Palma et al. ................... 192/30 W X

FOREIGN PATENT DOCUMENTS 1046421 12/1958 Fed. Rep. of Germany ... 192/30 W
979487 1/1965 United Kingdom ............. 192/56 R
1370011 10/1974 United Kingdom ............. 192/30 W
434205 3/1973 U.S.S.R. .......................... 192/30 W Primary Examiner—Rodney H. Bonck
Assistant Examiner—Richard M. Lorence

[57] ABSTRACT

A device for limiting the torque transmitted from an input shaft to an output shaft comprises a spring-loaded clutch interconnecting said shafts. Relative movement between parts of the clutch when a predetermined output torque is exceeded results in application of a brake which arrests the output shaft. A subsequent increase in torque load results in application of an increased braking force by a second spring whose deformation results in operation of a latched indicator. The indicator is not therefore responsive to low-level transient torque overloads.

2 Claims, 4 Drawing Figures

TORQUE LIMITER WITH DEVICE INDICATING OPERATION THEREOF

This invention relates to devices for limiting torque applied to a shaft, and in particular to torque limiters including an indicator for showing that torque limitation has occurred. It is known to provide devices for limiting the torque applied by shafts to actuators for aircraft control surfaces. Such torque limiting devices normally incorporate a ball clutch in which relative movement between input and output members of the clutch occurs only when a predetermined level of torque is exceeded, this relative movement resulting in application of a brake. If the torque subsequently falls below the aforesaid predetermined value the brake is released and the transmission continues to operate normally. However, since application of the brake may indicate a malfunction of the actuator system driven thereby, it is desirable that an indicator device shall be provided which shows that braking has occurred.

It has been proposed to provide an indicator which is responsive to any relative movement between the input and output members of the clutch. It has been discovered, however, that such relative movement frequently occurs transiently without being of sufficient magnitude to operate the brake. If an indication is provided in response to such transient phenomena, the transmission and actuator system will subsequently be dismantled in an attempt to locate a non-existent fault. It is an object of the present invention to provide a torque limiter incorporating a device which provides an indication only when the brake in the limiter has been operated sufficiently to completely arrest motion of the transmission.

According to the invention there is provided a torque limiting device comprising an input shaft, an output shaft, a clutch having input and output elements coupled to said input and output shafts respectively one of said elements being movable with respect to the other element in response to a torque in excess of a predetermined value on said output shaft, a brake device responsive to an initial amount of said relative movement for arresting rotation of said output shaft, and an indicator device operable by a further amount of said relative movement, said indicator device including means for maintaining the device in its operated state.

Figure 2:
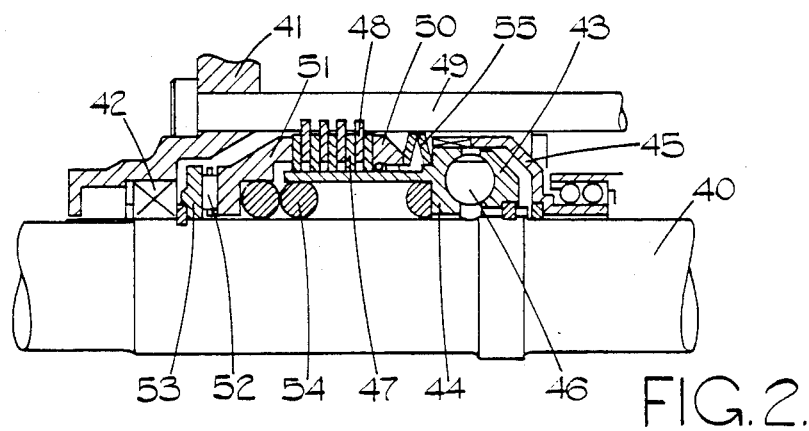
Figure 3:
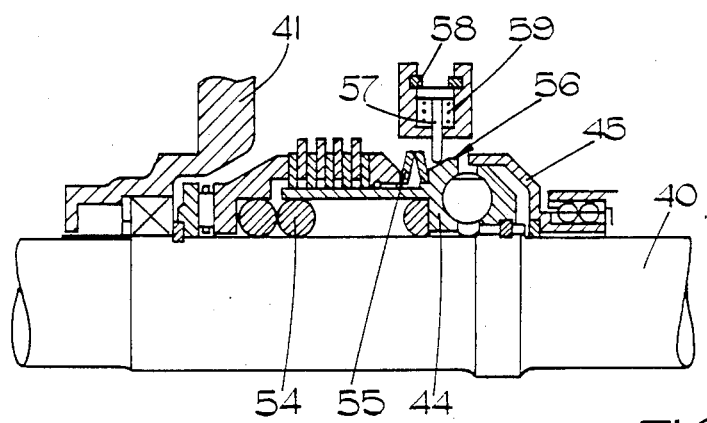
Figure 4:
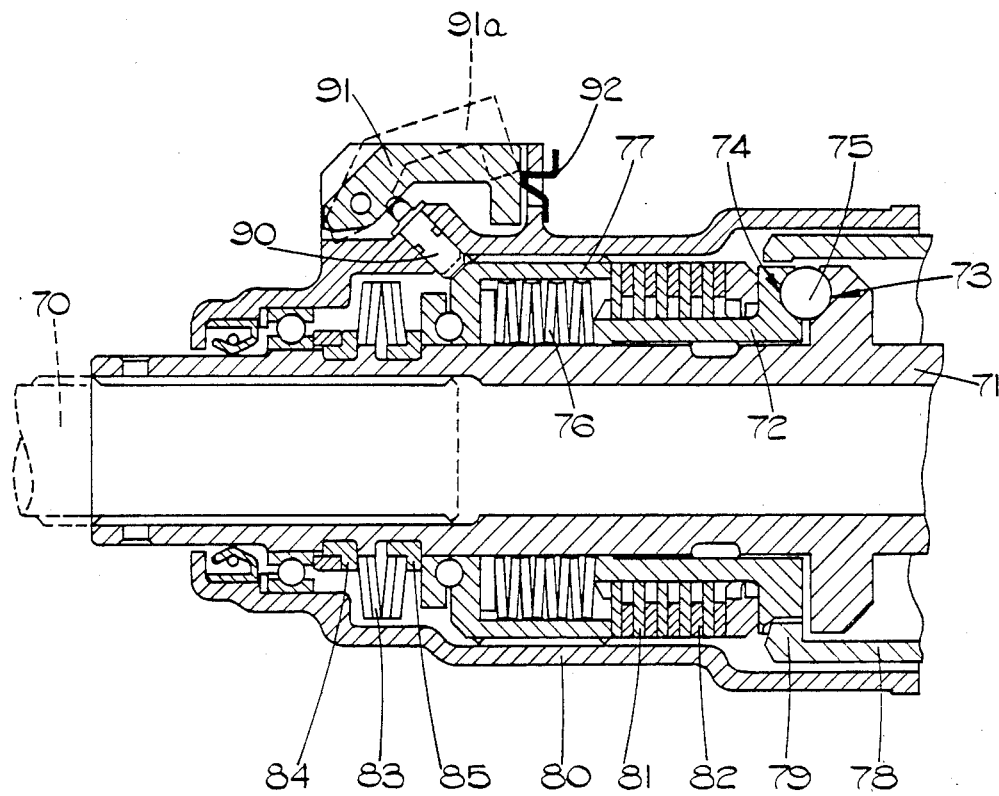

Embodiments of the invention will now be described by way of example only and with reference to the accompanying drawings in which:

FIG. 1 is a part-section through a torque limiting device according to the invention, FIG. 2 is a part-section through an alternative form of torque limiting device, FIG. 3 is a part-section, on a different plane, through the device of FIG. 2, and FIG. 4 is a section through a further alternative form of the device.

It is to be understood that in FIGS. 1 to 3, though the input shaft is shown in full, only those portions of the torque limiting device to one side of the shaft centre line are displayed.

As shown in FIG. 1 an input shaft 10 has keyed thereto an annular clutch input element 11. A face of the element 11 is directed towards an opposed face of an annular clutch output element 12. The opposed faces of the elements 11, 12 are provided with a plurality of aligned and circumferentially spaced recesses 13, 14 in which balls 15 are located. The element 12 is biassed towards the element 11 by means of a plurality of spring washers 16 which surround the shaft 10. A hollow output shaft 17 is in splined engagement with the output element 12. A plurality of annular brake discs 18 are slidably and non-rotatably mounted on an axially-extending part of the output element 12. A plurality of brake discs 19 are intercalated with the discs 18 and slidably and non-rotatably engage a plurality of pins 20 mounted in a fixed housing 21. A sleeve 22 is mounted on the shaft 10 and has an abutment face which engages one end of the stack of discs 18, 19, the other end of this stack being engaged by a spacer ring 23 which also engages the element 12. The shaft 10 is restrained by means (not shown) against axial movement relative to the housing 21 and the sleeve 22 is biassed against a flange 28 on the shaft 10 by spring washers 24 located between the sleeve 22 and a collar 25 which is located by means of a further sleeve 26 surrounding the sleeve 22. A small axial clearance 27 exists between the sleeve 26 and the sleeve 22 when the latter abuts the flange 23. A ball 30 is located in a through hole in the sleeve 26 and engages a recess in a plunger 31 to restrain the latter against axial movement under the influence of a spring 32. A corresponding recess 33 is located on the sleeve 22 so as to be displaced axially from the ball 30 by an amount equal to the clearance 27 when the sleeve 22 abuts the flange 23.

In normal use a torque applied to the input shaft 10 is transmitted through the clutch 11, 15, 12 to the output shaft 17. When the torque load on the output shaft 17 exceeds a predetermined value relative angular displacement occurs between the elements 11, 12, causing the balls 15 to ride partly out of their recesses 13, 14 and to displace the element 12 axially away from the element 11. This axial displacement compresses the stack of discs 18, 19 into braking engagement and by virtue of the non-rotational engagement of the discs 19 with the pins 20, arrests rotation of the output shaft 17. If the torque load on the shaft 17 is maintained the balls 15 ride still further out of their recesses and the element 12 is displaced still further axially. This axial displacement causes the sleeve 22 to be moved axially against the bias of the spring washers 24, until the recess 33 is aligned with the ball 30, whereupon the latter enters the recess 33 and releases the plunger 31. The plunger 31 moves axially under the influence of the spring 32 into abutment with a nut 34 on the shaft 10. If the unacceptable torque level on the output shaft 17 disappears the recesses 14 move back into alignment with the recesses 13 and the braking interengagement between the discs 18, 19 is removed. The transmission thereafter continues to operate normally but the plunger 31 remains in abutment with the nut 34 and thereby provides an indication that full operation of the brake has occurred. Since release of the plunger 31 occurs only in response to movement of the sleeve 22 against the spring washers 24 after the output shaft 17 is fully braked, the plunger 31 does not provide an indication in response to transient relative movements between the clutch elements 11, 12.

FIGS. 2 and 3 show part sections of an alternative embodiment and represent part-sections at the same axial location, but in different transverse planes. An input shaft 40 is journalled in a housing 41 by a bearing 42. An annular clutch input element 43 is keyed to the shaft 40 and an annular clutch output element 44 is in splined engagement with a hollow output shaft 45. A plurality of balls 46 are engaged between pairs of opposed recesses in the elements 43, 44 in a like manner to that described with reference to FIG. 1. A stack of intercalated annular brake discs 47, 48 are non-rotatably supported on the element 44 and a pin 49 and are axially located between an annular spacer 50 and an annular abutment 51. The abutment 51 runs on a thrust bearing 52 which is supported by a collar 53 carried by the shaft 40. The clutch element 44 is biased towards the element 43 by a spring 54 engaged between the abutment 51 and the element 44. Spring washers 55 are engaged between the spacer 50 and the clutch element 44.

As shown in FIG. 3, at a circumferential position intermediate the pins 49 the periphery of the clutch element 44 has a ramped portion 56 which can engage a stem 57. The stem 57 is slidable in a bore which forms part of the housing 41. The spring washers 55 between the clutch element 44 and the spacer 50 do not, in normal use, apply an axial force to the discs 47, 48.

In normal use drive is transmitted from the shaft 40 to the shaft 45 through the clutch parts 43, 44, 46 in the manner described with reference to FIG. 1. In the event of an excessive torque load on the shaft 45 relative rotation initially urges the clutch element 44 against the spring 54 to provide braking interengagement between the discs 47, 48 and to arrest the shaft 45. If the aforesaid torque overload is maintained the spring washers 55 are compressed, in addition to the spring 54, and an end of the element 44 moves into engagement with the abutment 51. In this condition the ramped portion 56 of the element 44 urges the stem 57 upwards and displaces a circlip 58 from its location in the bore. Displacement of the circlip 58 and consequent movement of the stem 57 to a radially outward position under the influence of a spring 59 provides an indication that full braking has occurred. As before, subsequent removal of the torque overload on the shaft 45 allows the balls 46 to be reseated in the aligned recesses and drive to the output shaft 45 to be resumed.

In the embodiment shown in FIG. 4 an input shaft 70 is in splined engagement with an annular clutch input element 71. A face of the input element 71 is directed towards an opposed face of an annular clutch output element 72. The opposed faces of the elements 71, 72 are provided with a plurality of aligned and circumferentially spaced recesses 73, 74 in which balls 75 are located. The element 72 is biassed towards the element 71 by a stack 76 of spring washers which surround the element 71 and abut a sleeve 77 which is axially slidable on the element 71. A hollow output shaft 78 is in driving engagement with the element 72 by means of dogs 79.

A relatively fixed housing 80 surrounds the parts described above and the sleeve 77 is prevented from rotating relative to the housing 80 by suitable means, as for example by splined engagement therewith. A plurality of brake discs 81 are slidably and non-rotatably mounted on an axially-extending part of the output element 72. A plurality of brake discs 82 are intercalated with the discs 81. The discs 82 are axially movable with respect to the housing 80 but are prevented from rotating. Conveniently the discs 82 engage axially-extending projections on the sleeve 77.

The sleeve 77 is maintained in a rightward position, as viewed in the drawing, so as to maintain a slight preloading of the spring washer stack 76, by a double spring washer arrangement 83. The arrangement 83 acts between a fixed abutment 84 on the element 71 and a collar 85 which has limited sliding movement. A plunger 90 is frictionally engaged in the housing 80 and engages a face on the sleeve 77 so as to be urged outwardly by leftward movement of the sleeve 77. An outer end of the plunger 90 engages an indicator arm 91 to urge the latter radially outwardly in response to leftward movement of the sleeve 77.

In normal use a torque applied to the shaft 70 is transmitted through the clutch 71, 75, 72 to the output shaft 78. When the torque load on the output shaft 78 exceeds a predetermined value, relative angular displacement occurs between the elements 71, 72, causing the balls 75 to ride up the sides of their recesses 73, 74 and to displace the element 72 axially away from the element 71. This displacement compresses the stack 76 of spring washers against an abutment face at the end of the collar 77 and brings the discs 81, 82 into an initial frictional engagement which is only sufficient to effect braking of the output shaft. A further increase in torque load on the output shaft 78 increases the frictional compression and braking effect of the discs 81, 82. If the torque overload on the output shaft 78 increases still further the continuing leftward movement of the element 72 moves the sleeve 77 against the bias of the spring washer arrangement 83. The arrangement 83 has greater stiffness than that of the stack 76 which ensures that the aforesaid movement of the sleeve 77 occurs only after braking of the output shaft 78 has been fully effected. Leftward movement of the sleeve 77 causes the indicator arm 91 to be lifted to the position shown at 91a, in which position it is maintained by a spring latch 92 in the housing 80.

Since movement of the arm 91 occurs only in response to movement of the sleeve 77 after braking has occurred, the arm 91 does not provide an indication in response to transient relative movements between the elements 71, 72 of the clutch.

We claim:

1. A torque limiting device comprising an input shaft, an output shaft, a clutch having input and output elements coupled to said input and output shafts respectively, one of said elements being rotationally and axially movable with respect to the other element in response to a torque in excess of a predetermined value on said output shaft, a first spring biasing said elements against relative axial movement, a brake device responsive to an initial amount of said relative axial movement for arresting rotation of said output shaft, said brake device comprising a plurality of first discs mounted on said clutch output element for rotation therewith, a plurality of second discs intercalated with said first discs and secured against rotation, and an abutment towards which said discs are urged by said relative axial movement, said torque limiting device including a second spring urging said abutment towards said brake discs, an indicator device operable by movement of said abutment against said second spring, and means for retaining said indicator device in a position to which it has been operated by axial movement of said output element.

2. A torque limiting device comprising an input shaft, an output shaft, a clutch having input and output elements coupled to said input and output shafts respectively, said output element being rotationally and axially movable with respect to said input element in response to a torque in excess of a predetermined value on said output shaft, a first spring biasing said output element against axial movement, a brake device responsive to an initial amount of said axial movement for arresting rotation of said output shaft, said brake device comprising a plurality of first discs mounted on said clutch output element for rotation therewith, a plurality of second discs intercalated with said first discs and secured against rotation, and an abutment towards which said discs are urged by said axial movement, said torque limiting device including a second spring for urging said discs toward said abutment and coacting with said clutch output element, an indicator device operable by axial movement of said clutch output element against a combined force applied by said first and second springs, and means for retaining said indicator device in position after movement to a position to which it has been operated by axial movement of said clutch output element.

* * * * *